United States Patent

[11] 3,554,259

| | | |
|---|---|---|
| [72] | Inventor | John Webb<br>Egham, Surrey, England |
| [21] | Appl. No. | 767,338 |
| [22] | Filed | Oct. 14, 1968 |
| [45] | Patented | Jan. 12, 1971 |
| [73] | Assignee | The Firestone Tire & Rubber Company<br>Akron, Ohio |
| [32] | Priority | Oct. 20, 1967 |
| [33] | | Great Britain |
| [31] | | No. 47936/67 |

[54] TIRES
4 Claims, 3 Drawing Figs.

[52] U.S. Cl. .................................................. 152/352
[51] Int. Cl. .................................................. B60c 5/00,
B60c 9/00, B60c 11/00
[50] Field of Search .......................................... 244/100,
103, 103S; 152/352, 353, 209, 361

[56] References Cited
UNITED STATES PATENTS

| | | | |
|---|---|---|---|
| Re. 18,638 | 10/1932 | Michelin ....................... | 152/352 |
| 2,064,694 | 12/1936 | Simonds ....................... | 152/353X |
| 2,943,663 | 7/1960 | Antonson ..................... | 152/361X |
| 3,286,756 | 11/1966 | Ellenrieder et al. .......... | 152/209 |
| 3,435,874 | 4/1969 | Mirtain et al. ................ | 152/352 |

FOREIGN PATENTS

| | | | |
|---|---|---|---|
| 818,460 | 9/1937 | France ........................ | 152/352 |

*Primary Examiner*—Drayton E. Hoffman
*Attorneys*—S. M. Clark and David A. Thomas

ABSTRACT: This invention relates to a tire to be utilized on a cambered wheel assembly of an aircraft. The tire of this invention has its ground-engaging tread surface laterally offset in relation to the medial plane of the tire carcass and is mounted in the cambered wheel assembly so that the offset caused by the camber of the cambered wheel assembly is compensated for by the offset of the ground-engaging tread surface of the tire.

PATENTED JAN 12 1971

TIRES

BACKGROUND OF THE INVENTION

The present invention relates to tires and in particular it relates to tires for aircraft.

The construction of tires for aircraft requires consideration of different factors than are taken into account in the design of tires for road vehicles and land vehicles generally.

It is well known that the weight of all auxiliary equipment for aircraft should be kept to as low a value as is possible. For this reason, it is usual today to operate aircraft tires at a very high pressure whilst at the same time accepting a very high deflection of the tire walls in order to provide the necessary bearing area for the support of the aircraft. In this way it is possible to equip a heavy aircraft with much smaller wheels and tires than would be possible for land vehicles.

The very high deflections that are accepted with aircraft tires are only permissible because the distance which an aircraft travels on its wheels at any one time is limited to the distance required for taxiing and takeoff. Thus the very heavy amount of work to which the sidewalls and tread of the tires are subjected is accepted so as to keep the weight of the tire and wheel to a low value.

The loading on an aircraft tire and the deflection caused in its walls is greatest when the aircraft is rolling slowly during taxiing and progressively decreases during takeoff as the aircraft gathers speed. On the other hand, the tire is subjected to a considerable amount of abrasion at the moment of touchdown when the wheels are rapidly accelerated by contact with the ground. At this moment, however, the loading on the wheels is comparatively low by reason of the remaining lift of the wings of the aircraft.

By reason of the fact that it is an inflation bag the carcass of a tire is, in cross section, rounded in the crown area underneath the tread. As explained above, an aircraft tire undergoes very substantial deflection in contact with the ground to provide a substantial flattened area to provide a bearing surface. The tread, except for the grooves forming the tread pattern, form a substantially constant thickness overlay over the carcass, except for being somewhat thicker at the shoulders of the tread so as to increase the width of the bearing area in contact with the ground. It will accordingly be understood that the tread of an aircraft tire presents a somewhat rounded profile when out of contact with the ground and in consequence, on touchdown, the principal abrasion wear takes place at the point of maximum diameter of the tire.

In certain aircraft having high takeoff and landing speeds, it is known to camber the wheels at an angle to the vertical so as to make the aircraft run straight in accordance with known principles. It will accordingly be understood that all the abrasion wear occurring during landing occurs in a narrow band located to one side of the medial plane of the tire and the wear problem is somewhat aggravated by the fact that during taxiing the loading on the tire results in somewhat greater deflection of the tire in the area subjected to the greatest wear during touchdown.

It is an object of the present invention to provide an aircraft tire having a greater service life on an aircraft having cambered wheels than has heretofore been possible.

SUMMARY OF THE INVENTION

With this object in mind, this invention provides an aircraft tire for an aircraft having cambered wheels. This tire comprises a standard airplane tire carcass which may be made by any known means and a tread material which forms the ground-engaging tread surface. The ground-engaging tread surface is offset in a lateral direction on the carcass of the tire so that the tire may be molded to give a finished tire having the tread laterally offset in relation to the tire carcass. This construction provides a finished tire which has its ground-engaging tread surface laterally displaced in relation to the medial plane of the tire carcass thereby giving the tire one relatively thick, heavy tread shoulder and another relatively light tread shoulder. The ground-engaging tread surface is preferably offset by 5° to 10° in relation to the medial plane of the tire carcass; the amount of offset in the ground-engaging tread surface is that amount necessary to insure that the offset caused by the camber in the cambered wheel assembly is neutralized so that the deflection of the tire in the assembly is centered on the ground-engaging tread surface and not laterally displaced as is the case in a conventional tire. The measurement of the offset of the tread surface is determined by the distance in degrees from the medial plane of the tire carcass to the center of the ground-engaging tread surface. The offset of the ground-engaging tread surface is designed to compensate for the offset which results from the cambered location of the tire in the cambered wheel assembly. Preferably the relatively thick, heavy shoulder of the tread is not offset enough to extend laterally, to any appreciable extent, beyond the sidewall of the tire carcass. This construction will be set out in more detail in reference to the drawings.

The offset of the ground-engaging tread surface of the tire of this invention also results in the tire having the center line of its footprint moved towards the relatively thick, heavy shoulder of the tire and not through the medial plane of the tire so that the deflection of the tire in the cambered wheel assembly is centered on the tire's ground-engaging tread surface. This is not the case in a conventional tire mounted on a cambered wheel assembly. The offset caused by the camber of the wheel assembly results in the center of the footprint being located a distance laterally from the center line of the ground-engaging tread surface of the conventional tire; whereas the tire of this invention by offsetting its ground-engaging tread surface compensates for the offset caused by the wheel assembly with the result that the footprint is centered on the ground-engaging tread surface of the tire of this invention when it is mounted in the cambered wheel assembly.

Any of the common aircraft tire tread designs may be utilized in the tire of this invention. The preferred tread design for the tire of this invention is one containing a number of circumferential peripheral grooves, said number being greater than one. These tread grooves define ribs between the grooves. It is preferred that these peripheral grooves are equidistant from one another, but this is not necessary. The offset of the ground-engaging tread surface of the tire is measured in degrees from the medial plane of the tire carcass to the center of the ground-engaging tread surface in the case of a tire tread design having an odd number of grooves, the central groove at the center of the tread would be used as the reference point to measure the offset in relation to the medial plane of the tire carcass by a certain distance, preferably 5° to 10° in relation to the medial plane of the tire carcass.

DESCRIPTION OF THE DRAWINGS

Reference is now made to the accompanying drawings:

In FIG. 1, the tire of this invention comprises a carcass, 1, which may be of any standard airplane tire construction; that is, containing several layers of tire cord material. This body construction may be of the conventional bias angle type or of the radial type. The ground-engaging tread surface is designated generally as 10 and in this embodiment is shown as, containing tread grooves 4, 3, 4 and the corresponding treads ribs defined by these grooves 5, 2, 2, 6 (reading from left to right in FIG. 1). The outer grooves 4, 4 are symmetrically placed in relation to the central groove 3 so that the widths of the ribs 2, 2 are substantially equal. The tread shoulders are formed by ribs 5 and 6. In this embodiment, the thickness of the tread material of the ribs 2,2 and the shoulder rib 5 are substantially equal while the thickness of the shoulder rib 6 is necessarily thicker to retain a substantially uniform profile for the ground-engaging tread surface. The ground-engaging tread surface should be symmetrically about its center point; the center point in this embodiment is defined by groove 3. The entire road engaging tread surface is displaced by an angle of about 5° in relation to the medial plane 7 of the tire carcass. In FIG. 1, this offset is shown as angle A as defined by the medial plane of the tire carcass 7 and the tire radius line through the center of the ground-engaging tread surface, line 8. This angle measured in relation to the center of the medial plane of the tire carcass, point B in FIG. 1, may vary according to the camber angle of the leg of the undercarriage of the aircraft and the degree of movement during dynamic loading. The amount of offset of the ground-engaging tread surface is best determined from a detail study of the worn tire which has been used on the individual aircraft under consideration.

FIG. 2 illustrates another embodiment of the tire of this invention in which the tread is offset in the amount of 5°. This embodiment illustrates the tire of this invention containing reinforcing plies, 20, 21 in the tread material. These plies are a known principle that is applied to aircraft tires to prevent the stripping of the tread material from the carcass during high speed landings. The tread design illustrated in this example contains four grooves, indicated as reference 23. These grooves define 5 ribs, the three central ribs 24, 25, 26 and the two outermost ribs 27 and 28. In this embodiment the reference point for determining the degree of offset of the ground-engaging tread surface is the center of rib 25 (indicated as 30 on the drawing). The heavy, thick shoulder is indicated as containing rib 28 and the light shoulder is indicated as containing rib 27. Again, the offset is shown as angle A as defined by the medial plane of the tire carcass, 7, and the tire radius line through the center of the ground-engaging tread surface, line 8 through point 30, with the intersection of the lines being at the center of the medial plane of the tire carcass, point B.

FIG. 3 illustrates an airplane employing a cambered wheel assembly utilizing the tire of this invention. The airplane is generically indicated as reference 40 with the cambered wheel assemblies indicated as 41 and 42, respectively. The cambered wheel assembly comprises leg 43, axle and rim pieces represented as 44 and the tire of this invention 45. This FIG. illustrates the cambered wheel assemblies mounted with an outboard camber (mounted with the tire tilted so that the area, 46, of the tread surface in contact with the ground is farther away from the body of the aircraft than the area, 47, of the tread surface, 180° away from the tread surface in contact with the ground) and with the tire of this invention mounted so that the heavy, thick shoulder, 6, is located on the inboard side and the light tread shoulder, 5, is located on the outboard side. By this arrangement, the offset of the tire of this invention compensates for the offset caused by the mounting of the cambered wheel assembly; thereby neutralizing the effect of the offset caused by the camber of the cambered wheel assembly on the deflected footprint of the tire. It is also understood that the cambered wheel assembly may be angled in the inboard direction (an inboard camber). In this instance, the tire of this invention would be mounted in the cambered wheel assembly so that the thick, heavy tread shoulder 6 would be on the outboard side and the light tread shoulder 5 would be on the inboard side to enable the tire of this invention to compensate for and neutralize the angle of the cambered wheel assembly.

Figure 1:
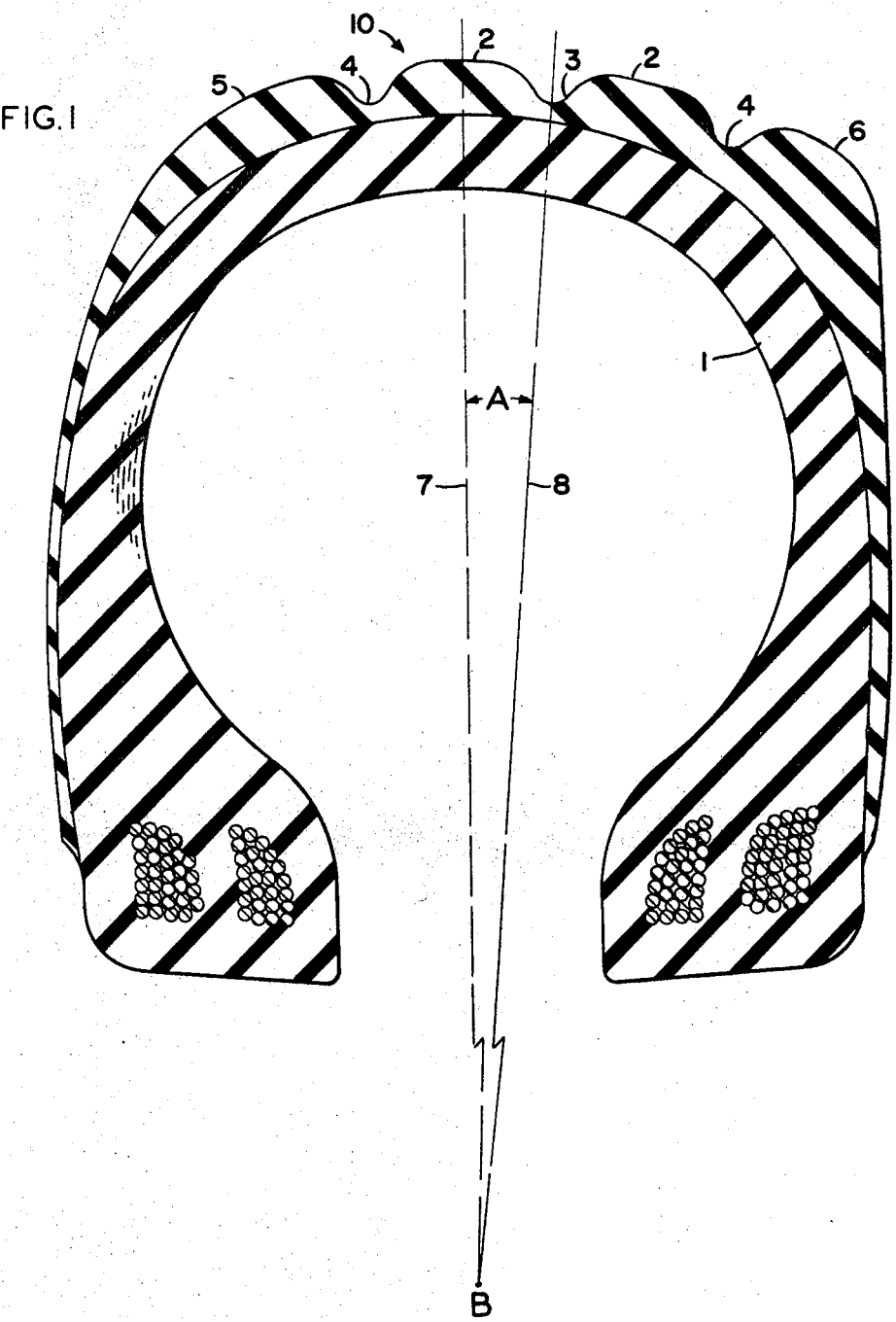
FIG. 1 is a cross-sectional view of one embodiment of the tire of this invention.
Figure 2:
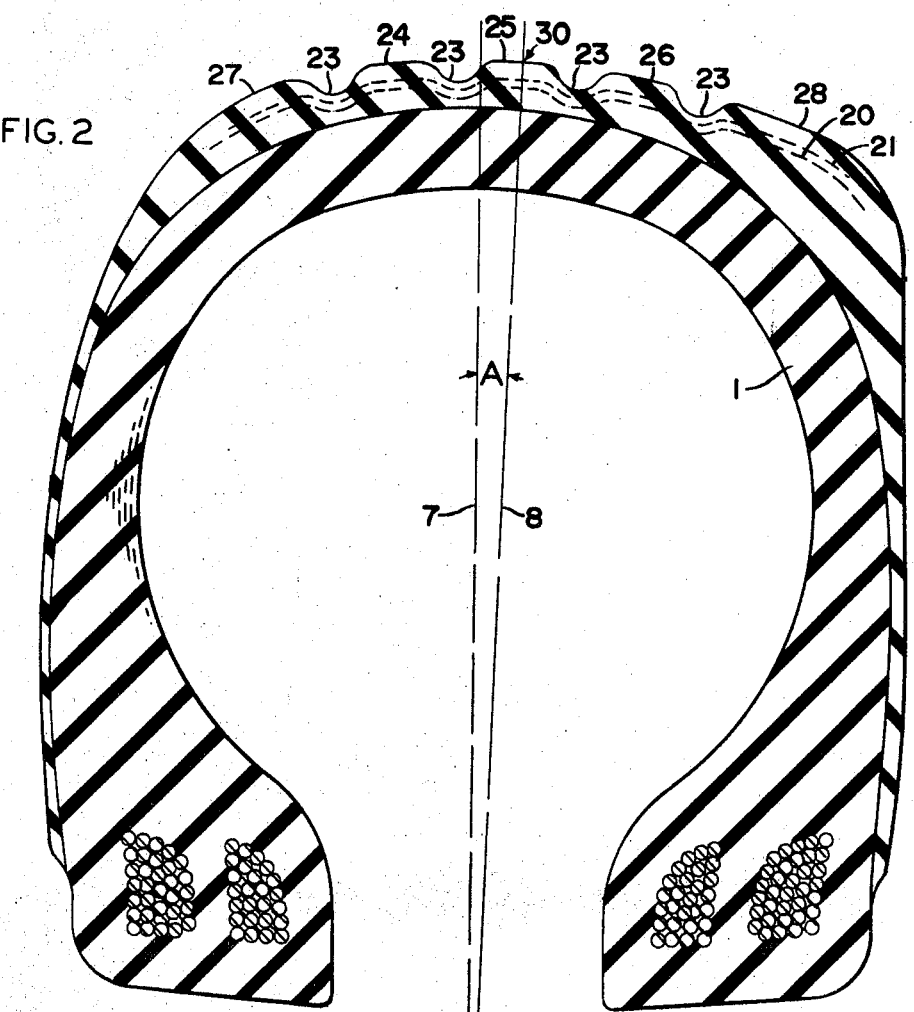
FIG. 2 is a cross-sectional view of another embodiment of this invention.
Figure 3:
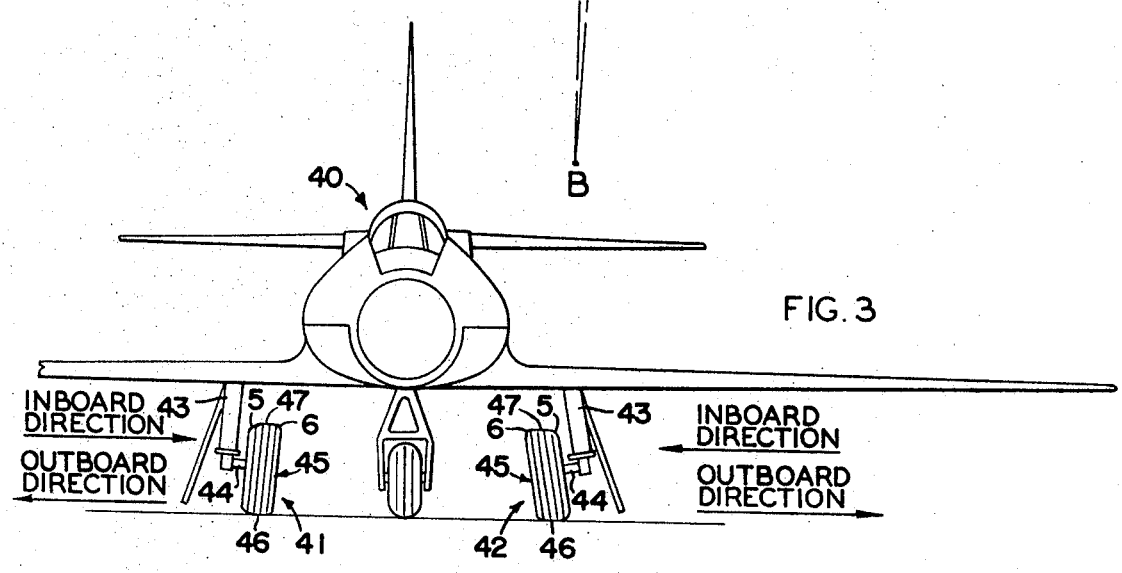
FIG. 3 is a head-on view of an airplane equipped with the tires of this invention mounted in their proper relationship to the cambered wheel assembly mountings.

The degree of offset required for the ground-engaging tread surface of the tire of this invention in relation to the medial plane of the tire carcass will be dictated by the degree of offset caused by the angle of the cambered wheel assembly so that the offset of the tire will compensate for the offset caused by the cambered wheel assembly. In practice, it has been found that the offset of the ground-engaging tread surface in the tire is usually in the range of 5° to 10° although certain conditions may make it necessary to offset the ground-engaging tread surface as little as 2° or as much as 15°.

It is found that a tire constructed in accordance with the present invention has a substantially increased service life on an aircraft having cambered wheels as compared with an otherwise identical tire having the tread arranged symmetrically about the medial plane of the tire carcass.

While the preferred embodiments of the invention are set out, it is understood that equivalent constructions may be devised without departing from the scope of the invention.

I claim:

1. A cambered wheel assembly for an aircraft tire comprising a leg, an axle, a rim, and an asymmetric tire; a said leg connecting said aircraft to said axle, said axle connecting said rim to said leg, said asymmetric tire mounted on said rim; said tire having a standard carcass and a ground-engaging tread surface comprised of tread material and mounted on said carcass; the improvement comprising said asymmetric tire having its tread material laterally offset in relation to the median plane of said carcass so that the said tread surface is laterally offset thereby compensating for the offset caused by the camber in said cambered wheel assembly when said tire is mounted in said cambered wheel assembly.

2. The cambered wheel assembly of claim 1, wherein said offset of said ground-engaging tread surface is approximately equal to said offset caused by the camber in said cambered wheel assembly.

3. An asymmetric aircraft tire for a cambered wheel assembly having a carcass and a ground-engaging tread surface comprised of tread material and mounted on a said carcass, said tread material laterally offset in relation to the median plane of the said tire carcass so that the median plane of said ground-engaging tread surface is laterally offset approximately 5° to 10° in relation to said median plane of said tire carcass thereby compensating for the offset caused by the camber in the cambered wheel assembly when the said tire is mounted in said cambered wheel assembly.

4. An asymmetric aircraft tire for a cambered wheel assembly having a standard tire carcass and a ground-engaging tread surface comprised of tread material and mounted on said carcass, said tread material laterally offset in relation to the median plane of said tire carcass thereby laterally offsetting the median plane of said tread surface approximately 5° to 10° in relation to said median plane of said standard tire carcass so that the resulting asymmetry will compensate for the offset caused by the camber in the cambered wheel assembly and resulting in the tread surface uniformly engaging the ground.